US012681515B2

(12) United States Patent
Eberlein

(10) Patent No.: US 12,681,515 B2
(45) Date of Patent: Jul. 14, 2026

(54) VOLTAGE REFERENCE CIRCUIT USING DIFFERENTIAL FEEDBACK

(71) Applicant: Apple Inc., Cupertino, CA (US)

(72) Inventor: Matthias Eberlein, Holzkirchen (DE)

(73) Assignee: Apple Inc., Cupertino, CA (US)

( * ) Notice: Subject to any disclaimer, the term of this patent is extended or adjusted under 35 U.S.C. 154(b) by 382 days.

(21) Appl. No.: 18/340,737

(22) Filed: Jun. 23, 2023

(65) Prior Publication Data

US 2024/0427360 A1 Dec. 26, 2024

(51) Int. Cl.

| | |
|---|---|
| ***G05F 1/46*** | (2006.01) |
| ***G05F 1/575*** | (2006.01) |
| ***G05F 1/59*** | (2006.01) |

(52) U.S. Cl.
CPC .............. *G05F 1/468* (2013.01); *G05F 1/575* (2013.01); *G05F 1/59* (2013.01)

(58) Field of Classification Search
CPC ............. G05F 1/468; G05F 1/59; G05F 1/575
See application file for complete search history.

(56) References Cited

U.S. PATENT DOCUMENTS

| | | | | |
|---|---|---|---|---|
| 6,055,145 | A | 4/2000 | Lagree et al. | |
| 6,266,257 | B1 | 7/2001 | Geissler | |
| 6,380,799 | B1 * | 4/2002 | Chung | G11C 11/407 327/543 |
| 7,075,281 | B1 * | 7/2006 | Pettersen | G05F 1/575 323/907 |
| 7,466,115 | B2 * | 12/2008 | Biagi | H03F 1/52 323/280 |
| 10,476,457 | B2 | 11/2019 | Schober et al. | |
| 2010/0052636 | A1 * | 3/2010 | Takagi | G05F 1/573 323/281 |
| 2012/0187930 | A1 * | 7/2012 | Williams | G05F 1/5735 323/273 |
| 2018/0307259 | A1 * | 10/2018 | Ogura | G05F 1/575 |
| 2019/0294190 | A1 * | 9/2019 | Okeya | G05F 3/24 |
| 2021/0149424 | A1 * | 5/2021 | Chauhan | G05F 1/468 |
| 2023/0035977 | A1 * | 2/2023 | Huang | G05F 1/59 |

* cited by examiner

*Primary Examiner* — Lakaisha Jackson
(74) *Attorney, Agent, or Firm* — Kowert, Hood, Munyon, Rankin & Goetzel, P.C.; Scott W. Pape; Dean M. Munyon

(57) ABSTRACT

A voltage reference circuit included in a computer system includes an asymmetric differential amplifier circuit that includes two metal-oxide semiconductor (MOS) transistors with different threshold voltages and different current densities. The voltage reference circuit also includes a driver circuit that generates, using a control signal, an output current that is used by a divider circuit to generate a reference voltage and a feedback voltage. The reference voltage and the feedback voltage are used by the asymmetric differential amplifier circuit to generate the control signal.

20 Claims, 10 Drawing Sheets

VOLTAGE REFERENCE CIRCUIT USING DIFFERENTIAL FEEDBACK

BACKGROUND

Technical Field

This disclosure relates to analog circuits in computer systems and, more particularly, to voltage reference circuits.

Description of the Related Art

Modern computer systems include many circuits that need to maintain their operation regardless of variations in the manufacturing process, power supply voltage level, and temperature. Such circuits can include analog-to-digital converter circuits, digital-to-analog converter circuits, radio-frequency (RF) circuits, high-speed input/output (I/O) circuits, and the like.

To maintain stable operation across variations in process, voltage, and temperature (PVT), circuits rely on stable voltages and currents that exhibit little dependence on power supply voltage and process parameters, and a well-defined dependence on temperature. For example, the voltage gain and noise of a differential amplifier circuit is dependent on a current used to bias a differential pair included in the differential amplifier circuit.

One technique to generate a voltage or current that varies little with process variation and changes in power supply voltage is to base the voltage or current on a physical property of silicon. A commonly used property of silicon used in many reference circuits is the band or energy gap of silicon. The band gap refers to an energy range in silicon where no electronic states can exist. Using the band gap allows the generation of currents and voltages that remain relatively constant with variations in process and power supply voltage.

DETAILED DESCRIPTION OF EMBODIMENTS

Figure 1:
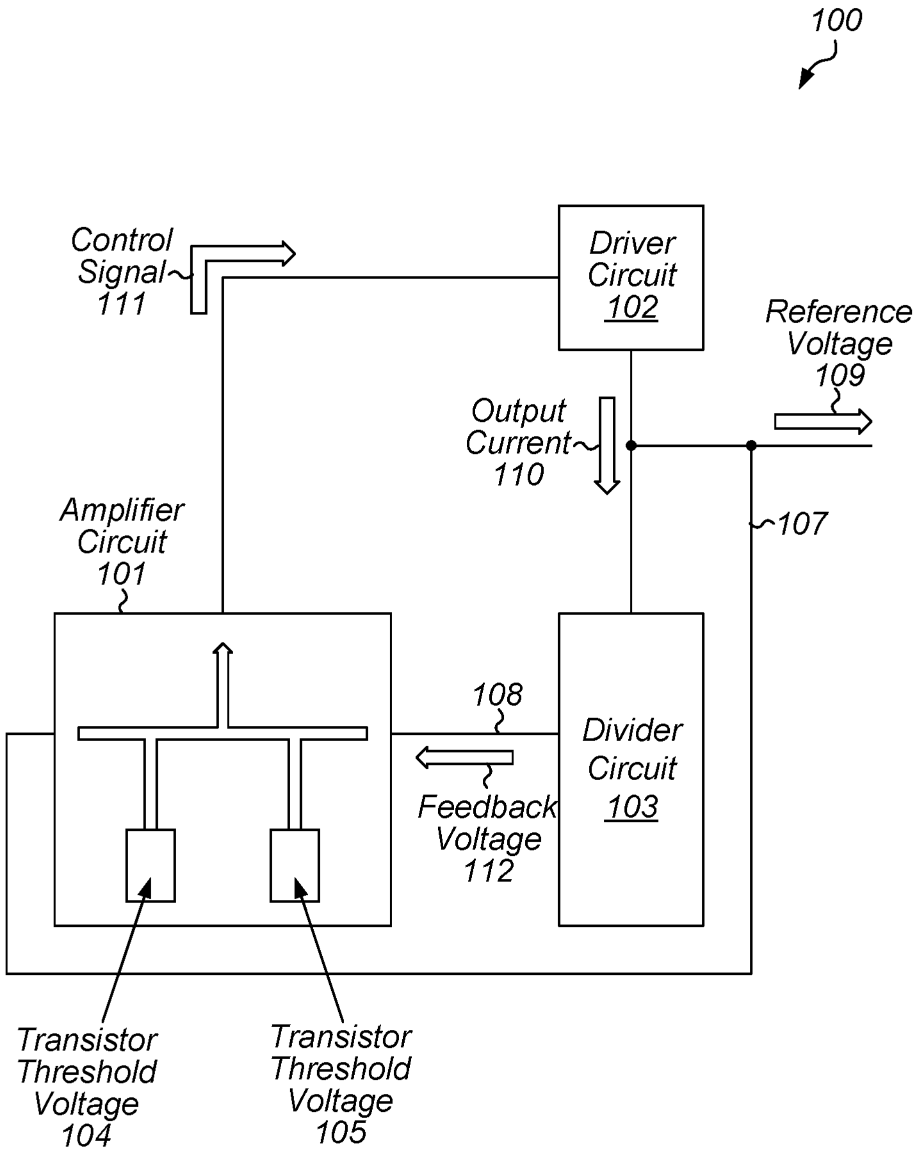
FIG. 1 is a block diagram of an embodiment of a voltage reference circuit for a computer system.

Computer systems may include multiple circuit blocks configured to perform specific functions. Such circuit blocks may include analog, mixed-signal, and radio-frequency (RF) circuits. Such circuits may include power detection circuits, performance monitoring circuits, temperature sensor circuits, power converter circuits, voltage regulator circuits, and the like.

Many analog, mixed-signal, sensor, and RF circuits rely upon precision voltage reference circuits that generate reference voltages that vary little with respect to operational parameters (e.g., supply voltage level, temperature, etc.) of the reference circuit. Such precision circuits often rely on bandgap circuits, which create a voltage level that is based on the band gap of silicon, providing the needed precision and stability.

Reference circuits that are based on the band gap of silicon commonly employ bipolar junction transistors (BJTs) as a means of harnessing the silicon band gap voltage. Some semiconductor processes (referred to as "BiCMOS processes") allow for the use of both BJTs and metal-oxide semiconductor field-effect transistors (MOSFETs) on a common integrated circuit. When using a more conventional complementary metal-oxide semiconductor (CMOS) manufacturing process, explicit BJTs may not be available, but may be constructed using available layers of n-type and p-type doped silicon. Aggressive scaling in modern semiconductor manufacturing processes may prohibit the use of any type of bipolar structure, limiting the use of band-gap based voltage reference circuits.

The aggressive scaling of semiconductor manufacturing technology has also resulted in reduced power supply voltage levels. Such power supply voltage levels reduce the available voltage range needed to maintain devices in voltage reference circuits operating in saturation (referred to as "head room"). To maintain operation at power supply voltage levels below the native bandgap reference voltage (approximately 1.25V), many voltage reference circuits rely on a current-mode circuit topology that generates a reference voltage based on a difference between a proportional-to-absolute temperature (PTAT) current and a complementary-to-absolute-temperature (CTAT) current. By combining a PTAT current with a CTAT current on a circuit node, the differing relationships to temperature cancel each other out, resulting in a voltage on a circuit node whose variation is minor with respect to temperature.

Such current-mode voltage reference circuits use an open-loop architecture, i.e., the operation of the voltage reference circuit is not compensating for changes in the output of the voltage reference circuit. Without such adjustments, open-loop voltage reference circuits are highly sensitive to power supply noise, device noise, leakage currents at the output, and circuit element mismatch, making high precision and high performance difficult to achieve.

In some cases, the level of power supply voltage levels are insufficient to bias BJTs, preventing their use in voltage reference circuits even with a current-mode architecture. Without BJTs, voltage circuits rely on MOSFETs, which are sensitive to bias levels and subject to variation in their electrical characteristics resulting from the manufacturing process.

To address the issues in voltage reference circuits when BJTs are unavailable or when power supply voltage levels are insufficient to properly bias BJTs, an asymmetric MOSFET-based differential pair architecture that generates PTAT and CTAT components can be employed. By employing MOSFETs with different threshold voltages in the differential pair and adjusting the size ratio between the two MOSFETs, a desired temperature coefficient of the reference voltage can be achieved. The embodiments illustrated in the drawings and described below provide techniques for generating a reference voltage that allows operation at power supply voltage levels insufficient for BJT operation or when BJTs are unavailable by using a MOSFET-based differential pair with different threshold voltages and a differential feedback based on a generated reference voltage.

A block diagram of a voltage reference circuit is depicted in FIG. 1. As illustrated, voltage reference circuit 100 includes amplifier circuit 101, driver circuit 102, and divider circuit 103.

Driver circuit 102 is configured to generate output current 110 using control signal 111. In various embodiments, driver circuit 102 is configured to source output current 110 to node 107. As described below, to generate output current 110, driver circuit 102 may be configured to control a conductance between a power supply node and node 107.

Divider circuit 103 is coupled to node 107 and is configured to generate feedback voltage 112 and reference voltage 109 using output current 110. As described below, divider circuit 103 may be implemented as a resistive voltage divider circuit configured to generate reference voltage 109 and feedback voltage 112 as output current 110 flows through one or more resistors included in the resistive voltage divider circuit.

Amplifier circuit 101 includes a first transistor with transistor threshold voltage 104 and a second transistor with transistor threshold voltage 105. In various embodiments, transistor threshold voltage 105 is different than transistor threshold voltage 104. In various embodiments, amplifier circuit 101 is configured to generate control signal 111 using reference voltage 109, feedback voltage 112, and a difference between transistor threshold voltage 104 and transistor threshold voltage 105. In some embodiments, amplifier circuit 101 may be implemented as an asymmetric differential amplifier circuit, where a difference between transistor threshold voltage 104 and transistor threshold voltage 105 generates an offset in amplifier circuit 101 causing a gain for a first input of amplifier circuit 101 to be different than a gain for a second input of amplifier circuit 101. As used herein, an asymmetric differential amplifier circuit is a differential amplifier circuit whose differential pair is, by design, not symmetric, and provides different amounts of gain for the different input signals.

In various embodiments, voltage reference circuit 100 functions in a similar fashion to a two-stage amplifier circuit, where the first stage consists of amplifier circuit 101, and the second stage consists of driver circuit 102 and divider circuit 103. The feedback loop formed by the feedback to amplifier circuit 101 by divider circuit 103 functions in a similar fashion to a low-dropout regulator, with driver circuit 102 being able to adjust the value of output current 110 to allow for varying load conditions on node 107. Since reference voltage 109 and feedback voltage 112 are both generated using output current 110, and are both used as inputs to amplifier circuit 101, voltage reference circuit 100 employs differential feedback using the difference between reference voltage 109 and feedback voltage 112.

Figure 2:
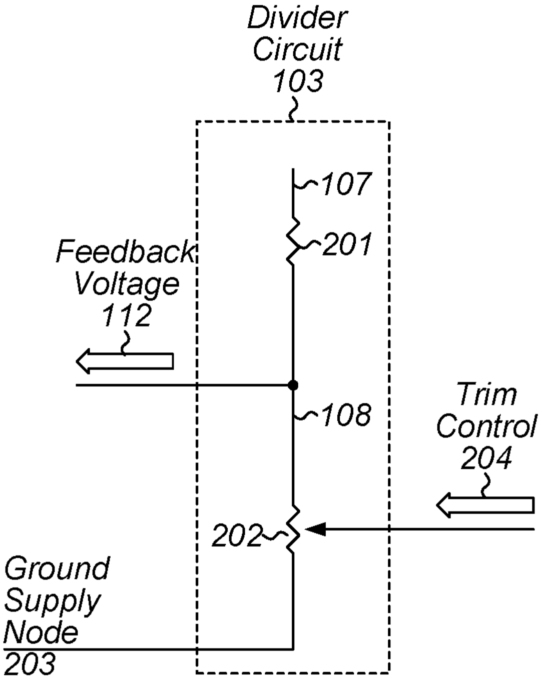
FIG. 2 is a block diagram of an embodiment of a divider circuit for a voltage reference circuit.

Turning to FIG. 2, a block diagram of divider circuit 103 is depicted. As illustrated, divider circuit 103 includes resistors 201 and 202. Although resistors 201 and 202 are depicted as single resistors, in other embodiments, any suitable series and/or parallel combination of resistors may be used to implement either of resistors 201 or 202.

Resistor 201 is coupled between node 107 and node 108, while resistor 202 is coupled between node 108 and ground supply node 203. As output current 110 flows from driver circuit 102 into ground supply node 203, respective voltage drops are developed across resistor 201 and resistor 202.

Resistors 201 and 202 may be implemented using metal, polysilicon, or any other suitable material available on a semiconductor manufacturing process. In other embodiments, resistors 201 and 202 may be implemented using active metal-oxide semiconductor field-effect transistors (MOSFETs), Fin field-effect transistors (FinFETs), gate-all-around field-effect transistors (GAAFETs), or any other suitable transconductance devices biased to provide a desired amount resistance.

In various embodiments, a value of resistor 202 may be adjusted using trim control 204 to scale the value of reference voltage 109 up or down. In such cases, resistor 202 may include multiple resistors and switches, and trim control 204 may include multiple signals that control corresponding ones of the switches. By adjusting the number of resistors coupled between node 108 and ground supply node 203, the value of resistor 202 can be varied along with the value of reference voltage 109. Information indicative of trim control 204 may be stored in a one-time programmable memory circuit, or other suitable circuit, during testing of an integrated circuit that includes voltage reference circuit 100.

Figure 3:
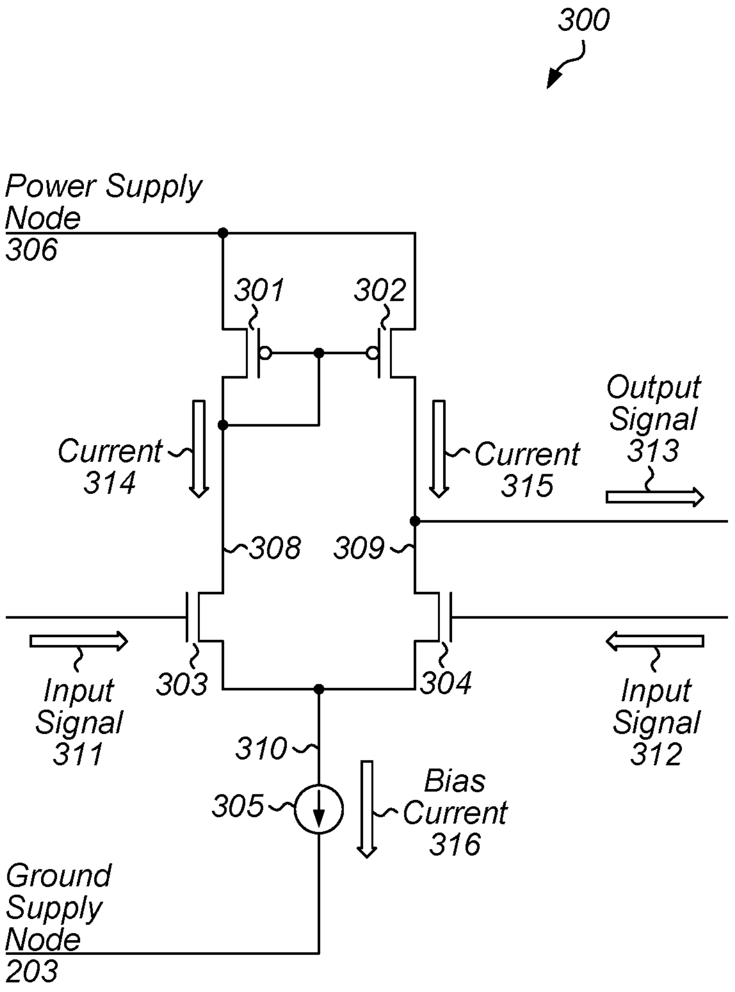
FIG. 3 is a block diagram of an amplifier circuit for a voltage reference circuit.

A block diagram of a differential amplifier circuit is depicted in FIG. 3. As illustrated, differential amplifier circuit 300 includes transistors 301-304 and current source 305. In various embodiments, differential amplifier circuit 300 may correspond to amplifier circuit 101 as depicted in the embodiment of FIG. 1.

Transistor 301 is coupled between power supply node 306 and node 308, while transistor 302 is coupled between power supply node 306 and node 309. Both transistor 301 and transistor 302 are controlled by a voltage level of node 308. In various embodiments, transistors 301 and 302 form a current mirror circuit configured to source current 314 and current 315 to transistor 303 and transistor 304, respectively. In various embodiments, transistors 301 and 302 may be implemented as p-channel MOSFETs, FinFETs, GAAFETs, or any other suitable type of transconductance devices.

Transistor 303 is coupled between node 308 and node 310, while transistor 304 is coupled between node 309 and node 310. Transistor 303 is controlled by input signal 311, and transistor 304 is controlled by input signal 312. In some embodiments, input signal 311 may correspond to reference voltage 109, and input signal 312 may correspond to feedback voltage 112.

In various embodiments, transistors 303 and 304 may be implemented as n-channel MOSFETs, FinFETs, GAAFETs, or any other suitable type of transconductance devices, and transistor threshold voltage 104 may correspond to a threshold voltage of transistor 303, while transistor threshold voltage 105 may correspond to a threshold voltage of transistor 304. As described above the respective threshold voltages of transistor 303 and transistor 304 may be different. In some embodiments, the threshold voltage of transistor 303 may be greater than the threshold voltage of transistor 304.

As described above in regard to FIG. 1, by employing different threshold voltages for transistors 303 and 304, differential amplifier circuit 300 asymmetrically amplifies the difference between input signal 311 and input signal 312. With the gate of transistor 303 connected to node 107 and the gate of transistor 304 connected to node 108, differential amplifier circuit 300 implements differential feedback resulting in the gate-to-source voltages of transistors 303 and 304 appear across resistor 202.

In various embodiments, if the physical characteristics of transistors 303 and 304 are the same (e.g., a width of transistor 303 is the same as the width of transistor 304), the voltage generated across resistor 202 is given by Equation 1, where $V_{202}$ is the voltage across resistor 303, $V_{th}(M_{303})$ is the threshold voltage of transistor 303, and $V_{th}(M_{304})$ is the threshold voltage of transistor 304.

$$V_{202} = V_{th}(M_{303}) - V_{th}(M_{304}) \quad (1)$$

In some cases, the threshold voltages of transistors 303 and 304 are defined by gate work-functions and have a CTAT characteristic. Additionally, the change in a threshold voltage (denoted as "$\Delta V_{th}$") can have a weak CTAT behavior as well. To reduce the variation of reference voltage 109 to temperature, a PTAT characteristic can be added to differential amplifier circuit 300 as well.

The ratio of a width-to-length ratio of transistor 303 to a width-to-length ratio of transistor 304 is referred to as the "size ratio" of the two transistors and is denoted by N. In some embodiments, the size ratio is selected to be larger than one, resulting in a current density through transistor 303 being greater than a current density through transistor 304 assuming that currents 314 and 315 are substantially the same. In cases where both transistors 303 and 304 are configured to operate in a sub-threshold region (also referred to as "weak inversion"), the PTAT voltage component is given in Equation 2, where $\eta$ is the sub-threshold slope factor for transistors 303 and 304, VT is the thermal voltage, and N is the size ratio of transistors 303 and 304. As used herein, the sub-threshold region of operation refers to a region of operation of a MOSFET where the gate-to-source voltage is less than a threshold voltage of the MOSFET and the drain-to-source current is a function of a thermal energy effect on energetic electrons that enter the source region of the MOSFET.

$$V_{ptat} = \eta \cdot VT \cdot \ln(N) \quad (2)$$

Combining Equation 1 and Equation 2 with the expression for a resistive voltage divider circuit, the value of reference voltage 109 can be determined using Equation 3, where $V_{ref}$ is the value of reference voltage 109, $R_{201}$ is the value of resistor 201, and $R_{202}$ is the value of resistor 202.

$$V_{ref} = \frac{R_{201} + R_{202}}{R_{202}}[\Delta V_{th} + \eta \cdot VT \cdot \ln(N)] \quad (3)$$

Current source 305 is coupled between node 310 and ground supply node 203. In various embodiments, current source 305 is configured to sink bias current 316 from node 310. Current source 305 may be configured to set a value of bias current 316 to determine an operating point for the differential pair formed by transistors 303 and 304. In some embodiments, bias current 316 may be selected to assist in maintaining transistors 303 and 304 in sub-threshold operation.

In various embodiments, transistors 301 and 302 may be implemented as p-channel MOSFETs, FinFETs, GAAFETs, or any other suitable type of transconductance devices, and transistors 303 and 304 may be implemented as n-channel MOSFETs, FinFETs, GAAFETs, or any other suitable type of transconductance devices. Although depicted as single transistors, in other embodiments, any of transistors 301-304 may be implemented using any suitable combination of devices coupled together in series and/or in parallel.

Although the embodiment of FIG. 3 is depicted as using n-channel transistors for the differential pair, in other embodiments, p-channel transistors can be used to implement the differential pair. In such cases, the current mirror circuit formed by transistors 301 and 302, and current source 305 may be implemented using n-channel versions of those circuits.

Figure 4:
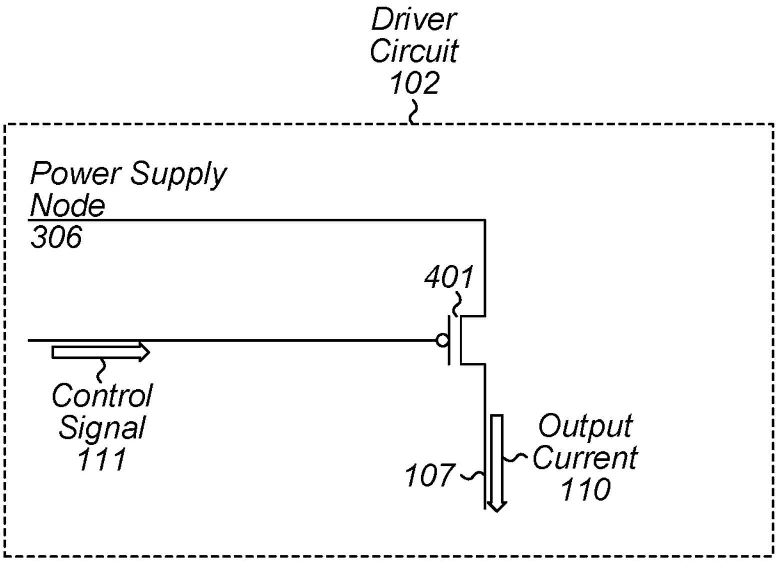
FIG. 4 is a block diagram of a driver circuit for a voltage reference circuit.

Turning to FIG. 4, a block diagram of an embodiment of driver circuit 102 is depicted. As illustrated, driver circuit 102 includes transistor 401. It is noted that although transistor 401 is depicted as a single transistor, in other embodiments, any suitable series and/or parallel combination of multiple transistors may be employed.

Transistor 401 is coupled between power supply node 306 and node 107, and is controlled by control signal 111. In various embodiments, transistor 401 is configured to adjust a conductance between power supply node 306 and node 107, thereby changing a value of output current 110 which, in turn, adjusts the value of reference voltage 109. For example, as a voltage level of control signal 111 decreases, transistor 401 is configured to increase the conductance between power supply node 306 and node 107, increasing output current 110.

In various embodiments, transistor 401 may be implemented using one or more p-channel MOSFETs, FinFETs, GAAFETs, or any other suitable transconductance devices.

Figure 5:
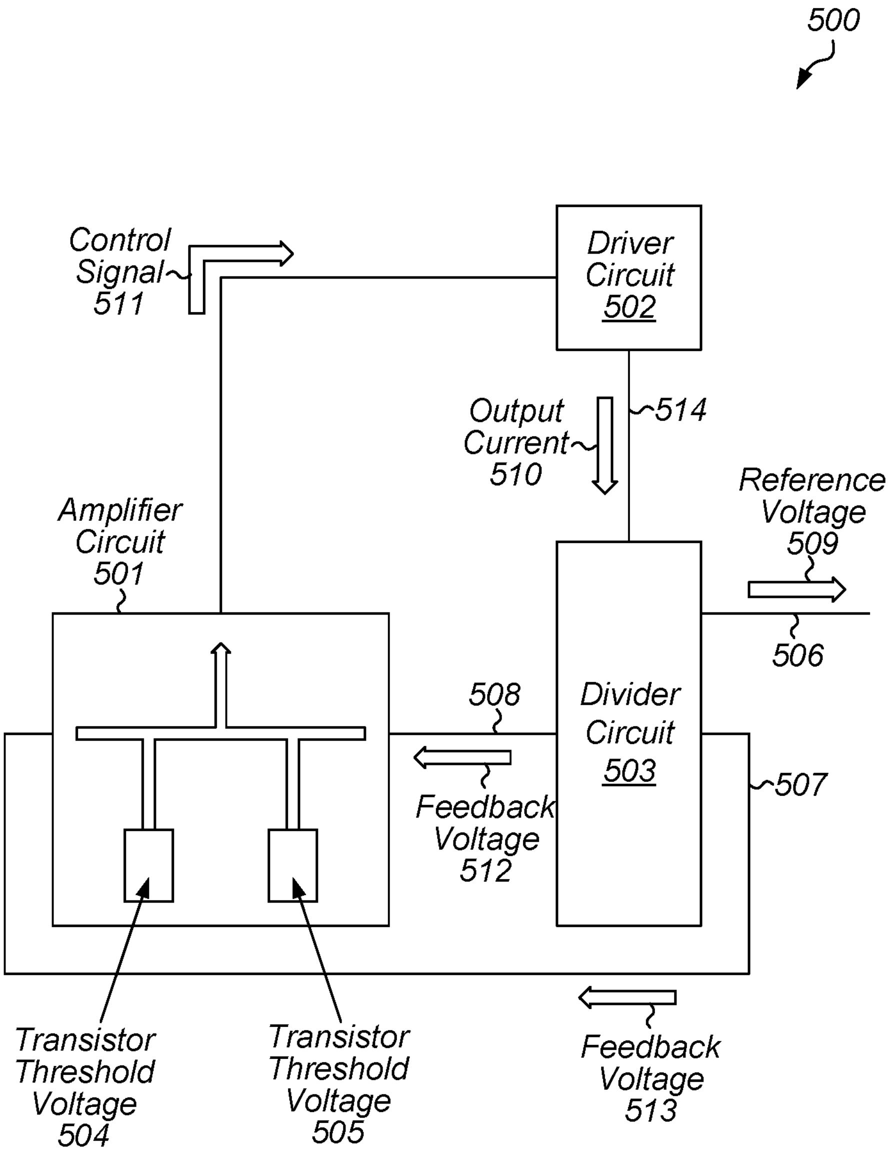
FIG. 5 is a block diagram of a different embodiment of a voltage reference circuit.

Turning to FIG. 5, a block diagram of another embodiment of a voltage reference circuit is depicted. As illustrated, voltage reference circuit 500 includes amplifier circuit 501, driver circuit 502, and divider circuit 503.

Driver circuit 502 is configured to generate output current 510 using control signal 511. In various embodiments, driver circuit 502 is configured to source output current 510 to node 514. In various embodiments, driver circuit 502 may correspond to driver circuit 102 as depicted in FIG. 4.

Divider circuit 503 is coupled to node 514 and is configured to generate feedback voltage 512, feedback voltage 513, and reference voltage 509 using output current 510. As described below, divider circuit 503 may be implemented as a resistive voltage divider circuit configured to generate reference voltage 509, feedback voltage 512, and feedback voltage 513 as output current 510 flows through one or more resistors included in the resistive voltage divider circuit. In some embodiments, the use of two feedback voltages, rather than using a single feedback voltage and the reference voltage may allow for additional scaling of the reference voltage to achieve a desired value for the reference voltage.

Amplifier circuit 501 is configured to generate control signal 511 using feedback voltage 512 and feedback voltage 513. In various embodiments, amplifier circuit 501 may be implemented as an asymmetric differential amplifier circuit, where an asymmetry of amplifier circuit 501 is based on a difference between transistor threshold voltage 504 and transistor threshold voltage 505. In some cases, amplifier circuit 501 may correspond to differential amplifier circuit 300 as depicted in FIG. 3.

Figure 6:
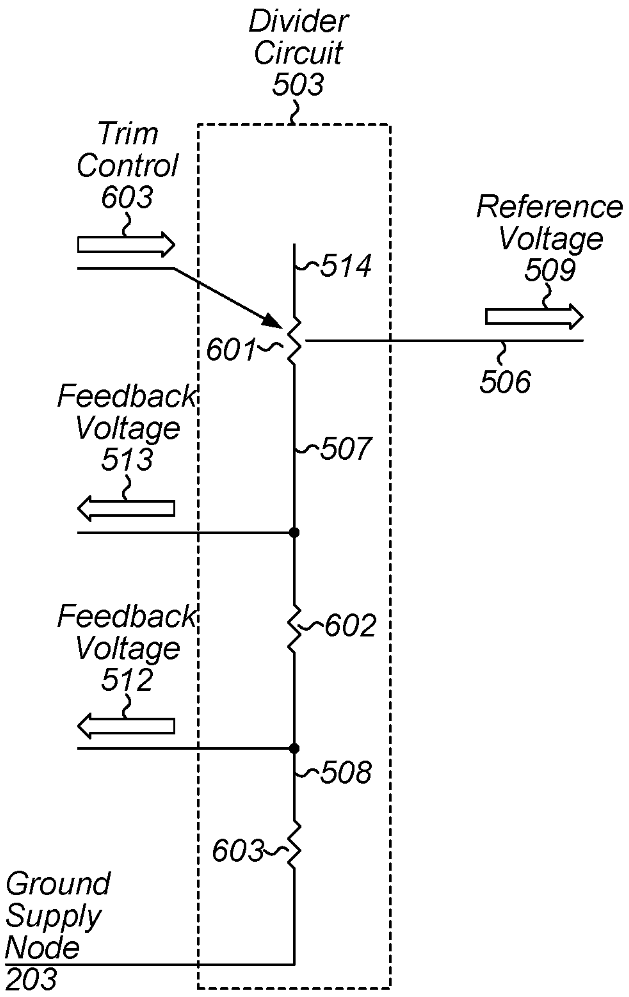
FIG. 6 is a block diagram of a different embodiment of a divider circuit for a voltage reference circuit.

A block diagram of divider circuit 503 is depicted in FIG. 6. As illustrated, divider circuit 503 includes resistors 601-603. In various embodiments, the increased number of resistors in divider circuit 503 as compared to divider circuit 103 allows for increased scaling of the value of reference voltage 509. Resistor 601 is coupled between node 514 and node 507. In a similar fashion, resistor 602 is coupled between node 507 and node 508, while resistor 603 is coupled between node 508 and ground supply node 203.

As output current 510 flows from driver circuit 502 into ground supply node 203, respective voltage drops are developed across resistors 601-603, generating reference voltage 509, feedback voltage 513, and feedback voltage 512, respectively.

Output node 506 can be coupled to different points within resistor 601 based on trim control 603. In some embodiments, a value for trim control 603 is determined during a post-manufacture test operation and stored in a one-time programmable memory or other suitable non-volatile memory circuit. Based on which of the different points within resistor 601 node 506 is coupled, the value of reference voltage 509 can be adjusted.

Resistors 601-603 may be implemented using metal, polysilicon, or any other suitable material available on a semiconductor manufacturing process. In other embodiments, resistors 601-603 may be implemented using active metal-oxide semiconductor field-effect transistors (MOSFETs), Fin field-effect transistors (FinFETs), gate-all-around field-effect transistors (GAAFETs), or any other suitable transconductance devices biased to provide a desired amount of resistance.

To summarize, various embodiments of a voltage reference circuit are disclosed. Broadly speaking, a voltage reference circuit includes a driver circuit, a divider circuit, and an asymmetric differential amplifier circuit. The driver circuit is configured to generate an output current using a control signal, and the divider circuit is configured to generate a feedback voltage and a reference voltage using the output current. The asymmetric differential amplifier circuit includes a first transistor with a first threshold voltage and a second transistor with a second threshold voltage different than the first threshold voltage. The asymmetric differential amplifier is configured to generate the control signal using the reference voltage, the feedback voltage, and a difference between a first threshold voltage of a first transistor and a second threshold voltage of a second transistor.

Figure 7:
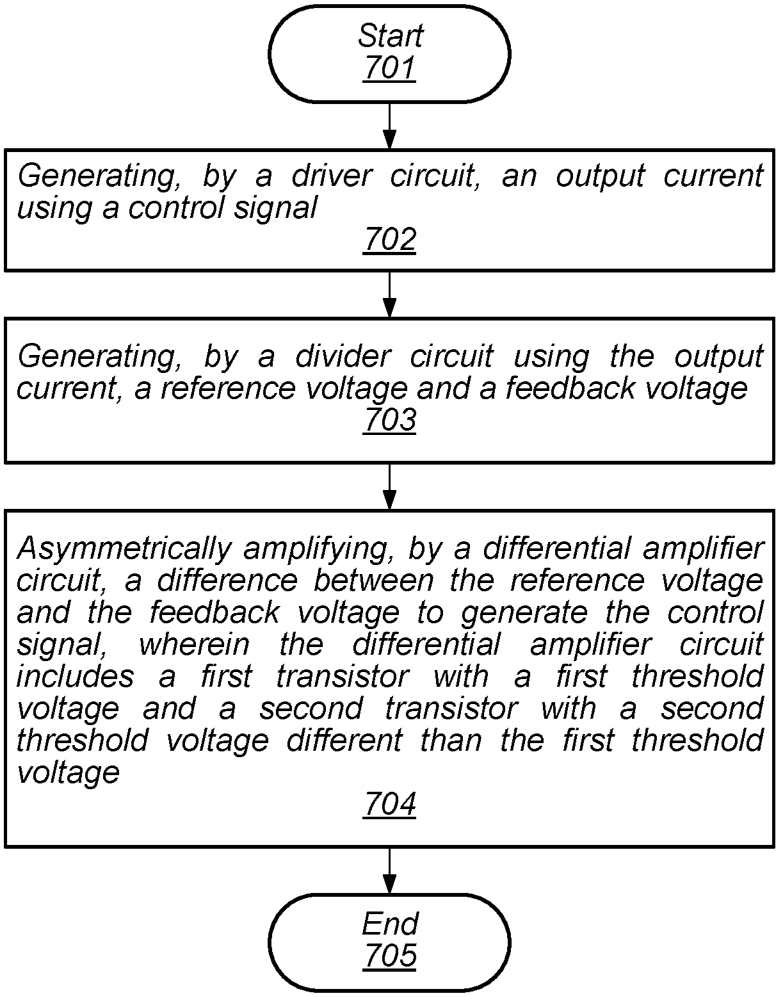
FIG. 7 is a flow diagram of an embodiment of a method for operating a voltage reference circuit.

Turning to FIG. 7, a flow diagram depicting an embodiment of a method for operating a voltage reference circuit is illustrated. The method, which may be applied to various voltage reference circuits, e.g., voltage reference circuit 100, begins in block 701.

The method includes generating, by a driver circuit, an output current using a control signal (block 702). In various embodiments, the driver circuit includes a transistor coupled between a power supply node and a reference node. In such cases, the method may further include adjusting a conductance of the transistor using the control signal.

The method further includes generating, by a divider circuit using the output current, a reference voltage and a feedback voltage (block 703). In various embodiments, the divider circuit includes at least a first resistor and a second resistor coupled, in series, between the driver circuit and a ground supply node. In other embodiments, the method may further include adjusting, based on a trim signal, a value of at least one of either the first resistor or the second resistor.

The method also includes asymmetrically amplifying, by a differential amplifier circuit, a difference between the reference voltage and the feedback voltage to generate the control signal (block 704). In various embodiments, the differential amplifier circuit includes a first transistor with a first threshold voltage and a second transistor with a second threshold voltage different than the first threshold voltage.

In some embodiments, the first transistor and the second transistor are metal-oxide semiconductor field-effect transistors. In such cases, asymmetrically amplifying the difference between the reference voltage and the feedback voltage includes operating the first transistor and the second transistor in a sub-threshold region of operation.

In other embodiments, asymmetrically amplifying the difference between the reference voltage and the feedback voltage includes establishing a first current density in the first transistor and a second current density in the second transistor. In such cases, the second current density is different than the first current density. In various embodiments, a first width-to-length ratio of the first transistor is different than a second width-to-length ratio of the second transistor. When employing different width-to-length ratios, establishing the first current density in the first transistor and the second current density in the second transistor includes providing, by a current mirror circuit, a first current to the first transistor and a second current to the second transistor, where a first value of the first current is the same as a second value of the second current.

In other embodiments, a first width-to-length ratio of the first transistor may be the same as a second width-to-length ratio of the second transistor. In such cases, establishing the first current density in the first transistor and the second current density in the second transistor includes providing, by a current mirror circuit, a first current to the first transistor and a second current to the second transistor, where a first value of the first current is different than a second value of the second current. The method concludes in block 705.

Figure 8:
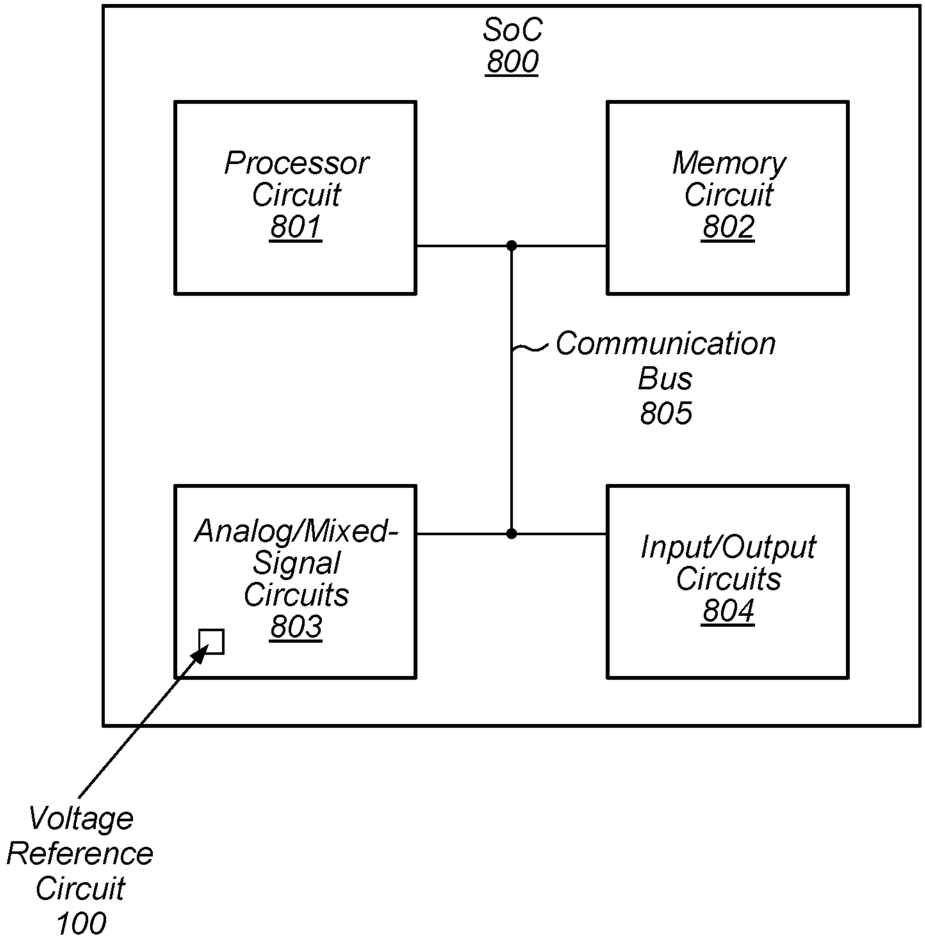
FIG. 8 is a block diagram of one embodiment of a system-on-a-chip that includes a voltage reference circuit.

A block diagram of a system-on-a-chip (SoC) is illustrated in FIG. 8. In the illustrated embodiment, SoC 800 includes processor circuit 801, memory circuit 802, analog/mixed-signal circuits 803, and input/output circuits 804 each of which is coupled to communication bus 805. In various embodiments, SoC 800 may be configured for use in a desktop computer, server, or in a mobile computing application such as, e.g., a tablet, laptop computer, or wearable computing device.

Processor circuit 801 may, in various embodiments, be representative of a general-purpose processor that performs computational operations. For example, processor circuit 801 may be a central processing unit (CPU) such as a microprocessor, a microcontroller, an application-specific integrated circuit (ASIC), or a field-programmable gate array (FPGA).

Memory circuit 802 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 8, in other embodiments, any suitable number of memory circuits may be employed.

Analog/mixed-signal circuits 803 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 803 may be configured to perform power management tasks with the inclusion of on-chip power supplies and voltage regulators. In some embodiments, analog/mixed-signal circuits 803 may include voltage reference circuit 100 as depicted in FIG. 1.

Input/output circuits 804 may be configured to coordinate data transfer between SoC 800 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 804 may be configured to implement a version of Universal Serial Bus (USB) protocol or IEEE 1394 (Firewire®) protocol.

Input/output circuits 804 may also be configured to coordinate data transfer between SoC 800 and one or more devices (e.g., other computing systems or integrated circuits) coupled to SoC 800 via a network. In one embodiment, input/output circuits 804 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 804 may be configured to implement multiple discrete network interface ports.

Figure 9:
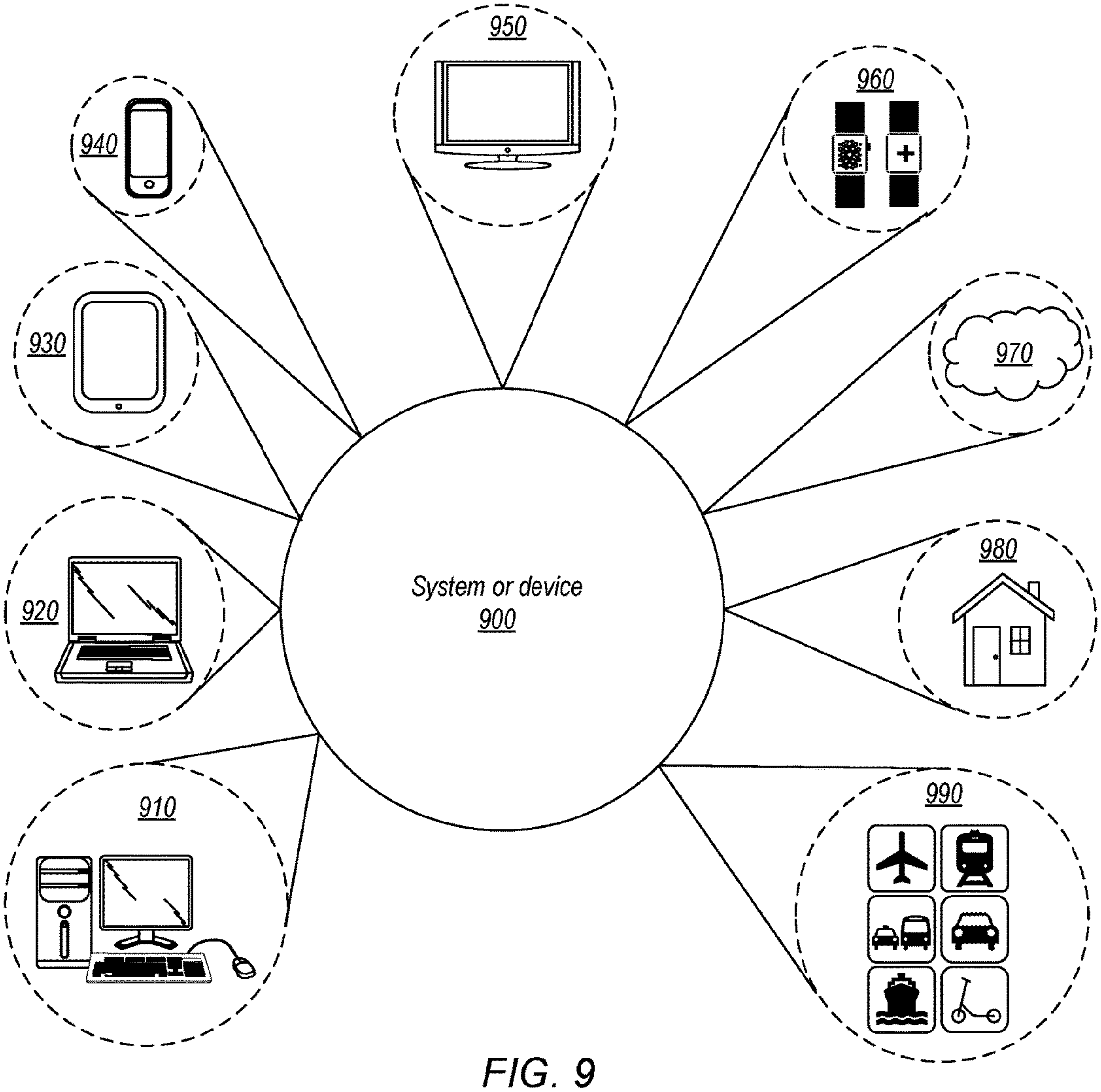
FIG. 9 is a block diagram of various embodiments of computer systems that may include voltage reference circuits.

Turning now to FIG. 9, various types of systems that may include any of the circuits, devices, or systems discussed above are illustrated. System or device 900, which may incorporate or otherwise utilize one or more of the techniques described herein, may be utilized in a wide range of areas. For example, system or device 900 may be utilized as part of the hardware of systems such as a desktop computer 910, laptop computer 920, tablet computer 930, cellular or mobile phone 940, or television 950 (or set-top box coupled to a television).

Similarly, disclosed elements may be utilized in a wearable device 960, such as a smartwatch or a health-monitoring device. Smartwatches, in many embodiments, may implement a variety of different functions for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 900 may also be used in various other contexts. For example, system or device 900 may be utilized in the context of a server computer system, such as a dedicated server or on shared hardware that implements a cloud-based service 970. Still further, system or device 900 may be implemented in a wide range of specialized everyday devices, including devices 980 commonly found in the home such as refrigerators, thermostats, security cameras, etc. The interconnection of such devices is often referred to as the "Internet of Things" (IoT). Elements may also be implemented in various modes of transportation. For example, system or device 900 could be employed in the control systems, guidance systems, entertainment systems, etc. of various types of vehicles 990.

The applications illustrated in FIG. 9 are merely exemplary and are not intended to limit the potential future applications of disclosed systems or devices. Other example applications include, without limitation: portable gaming devices, music players, data storage devices, unmanned aerial vehicles, etc.

Figure 10:
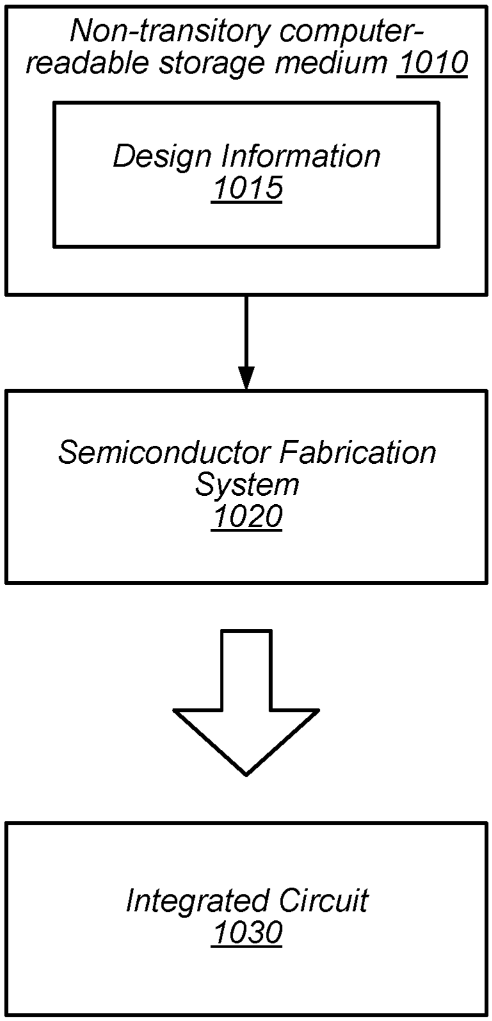
FIG. 10 illustrates an example of a non-transitory computer-readable storage medium that stores circuit design information.

FIG. 10 is a block diagram illustrating an example of a non-transitory computer-readable storage medium that stores circuit design information, according to some embodiments. In the illustrated embodiment, semiconductor fabrication system 1020 is configured to process design information 1015 stored on non-transitory computer-readable storage medium 1010 and fabricate integrated circuit 1030 based on design information 1015.

Non-transitory computer-readable storage medium 1010 may comprise any of various appropriate types of memory devices or storage devices. Non-transitory computer-readable storage medium 1010 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash or magnetic media (e.g., a hard drive), or optical storage; registers, or other similar types of memory elements, etc. Non-transitory computer-readable storage medium 1010 may include other types of non-transitory memory as well as combinations thereof. Non-transitory computer-readable storage medium 1010 may include two or more memory mediums, which may reside in different locations, e.g., in different computer systems that are connected over a network.

Design information 1015 may be specified using any of various appropriate computer languages, including hardware description languages such as, without limitation: VHDL, Verilog, SystemC, SystemVerilog, RHDL, M, MyHDL, etc. Design information 1015 may be usable by semiconductor fabrication system 1020 to fabricate at least a portion of integrated circuit 1030. The format of design information 1015 may be recognized by at least one semiconductor fabrication system, such as semiconductor fabrication system 1020, for example. In some embodiments, design information 1015 may include a netlist that specifies elements of a cell library, as well as their connectivity. One or more cell libraries used during logic synthesis of circuits included in integrated circuit 1030 may also be included in design information 1015. Such cell libraries may include information indicative of device or transistor level netlists, mask design data, characterization data, and the like, of cells included in the cell library.

Integrated circuit 1030 may, in various embodiments, include one or more custom macrocells, such as memories, analog or mixed-signal circuits, and the like. In such cases, design information 1015 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1020 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1020 may also be configured to perform various testing of fabricated circuits for correct operation.

In various embodiments, integrated circuit 1030 is configured to operate according to a circuit design specified by design information 1015, which may include performing any of the functionality described herein. For example, integrated circuit 1030 may include any of various elements shown or described herein. Further, integrated circuit 1030 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
- a driver circuit configured to generate an output current using a control signal, wherein a value of the output current is based on a voltage level of the control signal;
- a divider circuit configured to generate a feedback voltage and a reference voltage using the output current; and
- an asymmetric differential amplifier circuit that includes a first transistor with a first threshold voltage, and a second transistor with a second threshold voltage different than the first threshold voltage, wherein the asymmetric differential amplifier circuit is configured to:
  - receive, at a gate terminal of the first transistor, the reference voltage;
  - receive, at a gate terminal of the second transistor, the feedback voltage; and
  - generate the voltage level of the control signal based on a difference between the first threshold voltage and the second threshold voltage.

2. The apparatus of claim 1, wherein the first transistor is a metal-oxide semiconductor field-effect transistor configured to operate in a sub-threshold region, and wherein the second transistor is a metal-oxide semiconductor field-effect transistor configured to operate in the sub-threshold region.

3. The apparatus of claim 2, wherein the asymmetric differential amplifier circuit includes a current mirror circuit coupled to the first transistor and the second transistor, wherein the current mirror circuit is configured to provide a first current to the first transistor and a second current to the second transistor.

4. The apparatus of claim 3, wherein a first value of the first current is a same value as a second value of the second current, and wherein a first width-to-length ratio of the first transistor is different than a second width-to-length ratio of the second transistor.

5. The apparatus of claim 3, wherein a first value of the first current is different than a second value of the second current, and wherein a first width-to-length ratio of the first transistor is a same value as a second width-to-length ratio of the second transistor.

6. The apparatus of claim 1, wherein the divider circuit includes a plurality of resistors coupled between the driver circuit and a ground supply node, and wherein the divider circuit is further configured to adjust a value of at least one resistor of the plurality of resistors using a trim control signal.

7. A method, comprising:
- generating, by a driver circuit, an output current using a control signal, wherein a value of the output current is based on a voltage level of the control signal;
- generating, by a divider circuit using the output current, a feedback voltage and a reference voltage; and
- asymmetrically amplifying, by a differential amplifier circuit, a difference between the reference voltage and the feedback voltage to generate the control signal, wherein the differential amplifier circuit includes a first transistor with a first threshold voltage and a second transistor with a second threshold voltage different than the first threshold voltage, and wherein asymmetrically amplifying the difference between the reference voltage and the feedback voltage includes:
  - controlling a conductance of the first transistor using the reference voltage;
  - controlling a conductance of the second transistor using the feedback voltage; and
  - generating the voltage level of the control signal based on a difference between the first threshold voltage and the second threshold voltage.

8. The method of claim 7, wherein the first transistor and the second transistor are metal-oxide semiconductor field-effect transistors, and wherein asymmetrically amplifying the difference between the reference voltage and the feedback voltage includes operating the first transistor and the second transistor in a sub-threshold region of operation.

9. The method of claim 7, wherein asymmetrically amplifying the difference between the reference voltage and the feedback voltage further includes establishing a first current density in the first transistor and a second current density in the second transistor, wherein the second current density is different than the first current density.

10. The method of claim 9, wherein a first width-to-length ratio of the first transistor is different than a second width-to-length ratio of the second transistor, wherein establishing the first current density in the first transistor and the second current density in the second transistor includes providing, by a current mirror circuit, a first current to the first transistor and a second current to the second transistor, and wherein a first value of the first current is a same value as a second value of the second current.

11. The method of claim 9, wherein a first width-to-length ratio of the first transistor is a same value as a second width-to-length ratio of the second transistor, wherein establishing the first current density in the first transistor and the second current density in the second transistor includes providing, by a current mirror circuit, a first current to the first transistor and a second current to the second transistor, and wherein a first value of the first current is different than a second value of the second current.

12. The method of claim 7, wherein the divider circuit includes at least a first resistor and a second resistor coupled in series between the driver circuit and a ground supply node.

13. The method of claim 12, further comprising adjusting, based on a trim signal, a value of at least one of the first resistor or the second resistor.

14. An apparatus, comprising:

a functional circuit block coupled to a reference node; and a voltage reference circuit that includes a first transistor with a first threshold voltage and a second transistor with a second threshold voltage different than the first threshold voltage, wherein the voltage reference circuit is configured to:

source, based on a control signal, an output current to the reference node;

generate a feedback voltage and a reference voltage on the reference node using the output current;

control a conductance of the first transistor using the reference voltage;

control a conductance of the second transistor using the feedback voltage; and amplify, based on the difference between the first and second threshold voltages, a difference between the reference voltage and the feedback voltage to generate the control signal.

15. The apparatus of claim 14, wherein the first transistor and the second transistor are metal-oxide semiconductor field-effect transistors, and wherein to amplify the difference between the reference voltage and the feedback voltage, the voltage reference circuit is further configured to operate the first transistor and the second transistor in a sub-threshold region of operation.

16. The apparatus of claim 14, wherein to amplify the difference between the reference voltage and the feedback voltage, the voltage reference circuit is further configured to establish a first current density in the first transistor and a second current density in the second transistor, wherein the second current density is different than the first current density.

17. The apparatus of claim 16, wherein a first width-to-length ratio of the first transistor is different than a second width-to-length ratio of the second transistor, wherein to establish the first current density in the first transistor and the second current density in the second transistor, the voltage reference circuit is further configured to provide a first current to the first transistor and a second current to the second transistor, and wherein a first value of the first current is a same value as a second value of the second current.

18. The apparatus of claim 16, wherein a first width-to-length ratio of the first transistor is a same value as a second width-to-length ratio of the second transistor, wherein to establish the first current density in the first transistor and the second current density in the second transistor, the voltage reference circuit is further configured to provide a first current to the first transistor and a second current to the second transistor, and wherein a first value of the first current is different than a second value of the second current.

19. The apparatus of claim 14, wherein the voltage reference circuit includes at least a first resistor and a second resistor coupled in series between the reference node and a ground supply node.

20. The apparatus of claim 19, wherein the voltage reference circuit is further configured to adjust, based on a trim signal, a value of at least one of the first resistor or the second resistor.

* * * * *